Patented June 1, 1943

2,320,724

UNITED STATES PATENT OFFICE 2,320,724

METHOD OF TREATING STYRENE-UNSATURATED DICARBOXYLIC ACID RESINS

Howard L. Gerhart and William W. Bauer, Milwaukee, Wis., assignors to Pittsburgh Plate Glass Company, a corporation of Pennsylvania No Drawing. Application March 14, 1940, Serial No. 323,945

4 Claims. (Cl. 260—23)

The present invention relates to the manufacture of artificial resins and it has particular relation to the manufacture of resins of the type obtained by reacting a polymerizable olefin compound with an ethylene $\alpha$, $\beta$ dicarboxylic acid or an anhydride thereof.

One object of the invention is to provide an inexpensive resin of the above indicated type which is relatively flexible, compatible with modifying plastic materials, soluble in inexpensive solvents and which when applied as a film to surfaces can be dried or baked to tough strongly adherent films.

A second object of the invention is to provide a simple, easily controlled process of forming such resins.

Resinous bodies have heretofore been prepared by reacting olefinic bodies such as styrene with an ethylenic dicarboxylic acid anhydride, such as maleic anhydride to form compounds of addition. The resin obtained by the latter reaction is composed of a number of polymerized groups having the probable formula:

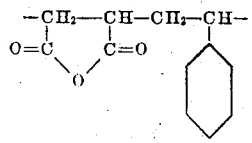

Such resins were incompatible with practically all of the common plastic materials employed in paints and varnishes, were relatively inflexible and could be dissolved in only a limited number of solvents.

The present invention involves the introduction into the foregoing group, of a partially esterified di or poly hydroxy alcohol in order to esterify all or a portion of the carboxyl or anhydride groups in the initial or starting resin to provide a product which is substantially superior to the parent resin with respect to the above noted objectionable features.

The invention involves as a further feature the provision of a process of forming such resins in which the esterification of the carboxyl or anhydride groups in the initial resin with the hydroxy ester is forced to take a desired course by preliminarily esterifying a portion of said carboxyl groups with a simple alcohol.

A type formula of compounds contemplated by the present invention is as follows:

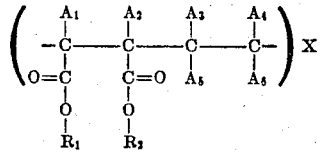

where X represents the number of groups which are linked together in the resin molecule.

The groups $A_1$, $A_2$, $A_3$, $A_4$, $A_5$, and $A_6$ may be hydrogen, chlorine, methyl, ethyl, benzyl phenyl, carbonyl or any other groups occurring in substituted maleic acid and polymerizable olefinic compounds, one or both of the groups $R_1$ and $R_2$ may be esters of polyhydric alcohols such as glycol, glycerol, or erythritol, etc. Where the polyhydric alcohol contains 3 or more hydroxyl groups a plurality of ester groups may be linked thereto. One of the groups $R_1$ and $R_2$ may, also, be hydrogen, chlorine or an alkyl residue of a simple alcohol such as ethyl or butyl alcohol.

Various procedures are possible in conducting the reactions involved in the preparation of the improved resins. One type of such procedure might involve simple heating to reaction temperature a polymerizable olefin, an ethylene dicarboxylic acid, a polyhydroxy alcohol and a monocarboxylic acid preferably in the presence of an inert solvent.

In many cases there is a tendency for the resinous products, when prepared by the foregoing method, to gel. It has now been found that this tendency may be obviated by first reacting the poly hydroxy alcohol and the monocarboxylic acid to form an ester having only one free hydroxy group. This hydroxy ester is then further esterified with the free carboxyl groups in the initial resin to provide the final product; but the hydroxy ester does not in all cases directly react with the carboxyls of the initial resin. However, it is found that if the latter are first in part esterified with a simple alcohol such as butyl alcohol or ethyl alcohol, the hydroxy ester will then easily and quickly react to provide the desired resin. The technique involved in both types of processes are illustrated by the following examples:

Example 1

In a three-necked, round-bottomed flask, equipped with a reflux condenser, thermometer and stirrer, is placed a mixture of 15.3 gm. maleic anhydride, 23 gm. soya bean oil acid obtained by splitting the free acids from the glycerides in soya bean oil and 20 grams triacetin. Another mixture consisting of 15.3 grams styrene, 12.4 gm. ethylene glycol and 50 grams triacetin is prepared while the first solution is heated to 140° C. A ⅓ portion of the latter solution is added to the former heated solution while the temperature is maintained at 140° C. for 10 minutes, then raised to 190° C. Approximately ⅕ portions of the second mixture are added at ½ hour intervals so that the time of addition is less than 2 hours.

The solution is heated for 2 hours at 190–195° C. in an atmosphere of carbon dioxide, then 2 hours with the temperature rising slowly to 245° C. During the last hour of heating, the reflux condenser is removed and the triacetin which is present as a solvent is caused to pass off by increasing the $CO_2$ feed, until only the theoretical weight of resin remains. The resin is conveniently removed by dissolving in a xylol fraction. The acid number is less than 10.

A solution of this resin was sprayed on a panel and baked 1 hour at 240° F. to a tough colorless film which was very slightly tacky. An additional hour at 310° F. produced a hard insoluble film which retained its toughness and good color.

Variations in this procedure can be made. The above describes the preparation of an alkyd resin 45% modified by soya bean oil acids. It has been found that a resin containing 35 to 50% oil acid can be prepared but that an oil acid content of less than 40% introduces the danger of gelling before the resinification is complete. Glycerol can be substituted conveniently for glycol. Likewise, linseed oil acids may be used instead of the soya oil acids.

*Example 2*

The vegetable oil acid molecule may be incorporated into the molecule of maleic acid anhydride—olefin resin, by a process which eliminates gels entirely and requires only from ½ to 2 hours. In this process, the hydroxy esters formed respectively with one mole ethylene glycol or ½ mole glycerol per mol of fatty oil acid, can be used to esterify the partly alkylated maleic acid-styrene resin.

It is not possible to react the hydroxy ester directly with the parent resin, but it has been found that if the resin is previously partially esterified with a simple alcohol the esterification can be completed with the hydroxy ester.

In a typical preparation, maleic anhydride-styrene resin was heated with a mole equivalent of n-butyl alcohol, thus forming the acid ester. When this acid ester was heated with a hydroxy ester (formed from two mole equivalents of linseed oil acids and one of glycerol), esterification was completed within an hour to give a resin of the probable structure:

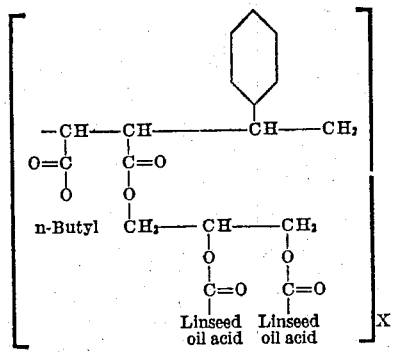

A solution of 25 grams maleic anhydride, 30 grams styrene and 50 cc. triacetin was maintained at 150° C. for 20 minutes under reflux. To a solution of 50.5 grams resin was added 19 grams of n-butyl alcohol and the solution maintained at 120° C. with agitation for 20 minutes.

Glycerol ester of linseed acids was prepared by heating 92 grams of glycerol with 540 grams of linseed oil acids for 1 hour at 220° C. in an atmosphere of carbon dioxide.

Ninety grams of the glycerol ester so prepared was added to the n-butyl alcohol derivative of maleic anhydride-styrene resin prepared above. The temperature was maintained at 130 to 140° C. for 35 minutes. This time was sufficient to increase the body of the resin solution but probably too short for complete esterification.

The resin solution was now slowly poured into well stirred petroleum type thinner in which it is insoluble. The thinner and triacetin was decanted and the free resin dissolved in xylol to give a solution having a solid content of 55.4% and an acid number of 40.5.

In similar manner, a parent resin, e. g., that obtained by reacting maleic acid with styrene, was treated with butyl alcohol to provide a partial ester. One portion of such ester was then further esterified with a monohydroxy ester of glycerol and acids from linseed oil glycerides. Likewise, a second portion of the partial ester was further esterified with the monohydroxy ester of glycol and the acids derived from the glycerides of soya bean oil. Both resins were found to be compatible with ethyl cellulose and with nitrocellulose.

The classes of primary reactants contemplated for use in practicing the invention is very large. The unsaturated dicarboxylic acids or acid anhydrides include not only maleic acid and maleic acid anhydride but also the known substitution products thereof where hydrogen of the ethylene group is in part or entirely replaced by such groups as chlorine, ethyl, methyl, phenyl, benzyl. Either one or two of the replaceable hydrogens may thus be substituted. The corresponding trans (fumaric) acids may be employed.

The class of polymerizable olefinic compounds which may be reacted with the ethylenic bicarboxylic acid to form the primary resins include styrene, methyl styrene, indene, coumarone, cinnamic acid, cinnamic aldehyde, esters, such as the ethyl ester of acrylic acid, methacrylic acid and ethyl acrylic acid, and such like esters thereof, acrolein, vinyl methyl ketone, vinyl acetate, and vinyl chloride.

The poly hydroxy alcohols include ethylene glycol, butylene glycols such as the 1–3 butylene glycol, diethylene glycol, triethylene glycol, glycerol, poly glycerols, erythritol mannitol and the like.

The acids which may be reacted with the hydroxyl groups of the poly hydroxy alcohols in the preparation of the hydroxy ester intermediates include practically any of the acids containing from 1 to 20 carbon atoms. Examples of these acids are formic acid, acetic acid, propionic and isopropionic acid, butyric and isobutyric acids, lactic acid, caproic acid, caprylic acid, capric acid, lauric acid, stearic acid, palmitic acid, oleic acid, drying oil acids from linseed oil, tung oil, fish oil, soya bean oil, or the like. The products obtained by use of the hydroxy esters of drying and semi-drying oil acids with glycol, glycerol or other poly hydroxy alcohol, to esterify the active carboxyls in the resin, are capable of drying at least in part by oxidation. These acids may be esterified with glycerol, glycol or other polyhydroxy alcohol and the hydroxy esters further esterified with the resin after the latter has been preliminarily esterified with a simple alcohol (e. g. methyl, ethyl, or butyl alcohol).

The forms of the invention herein disclosed are merely exemplary; numerous modifications may be made therein without departure from the spirit of the invention or the scope of the appended claims.

What we claim is:

1. A method of treating resin resulting from the polymerization by addendum reaction of styrene and a material selected from a group consisting of α β unsaturated ethylene α β dicarboxylic acids and the anhydrides of said acids, the resin containing the reactive carboxylic groups of said groups, which method comprises esterifying part of the carboxyl groups of said resin with a monohydroxy alcohol containing not substantially more than 4 carbon atoms and then further esterifying the remaining carboxyl groups of the resin with a monohydroxy alcoholic ester of a polyhydroxy alcohol and a fatty acid.

2. A method of treating resins resulting from the polymerization by addendum reaction of styrene and a material selected from a group consisting of α β unsaturated ethylene, α β dicarboxylic acids and the anhydrides thereof, said resins containing reactive carboxyl groups, which method comprises esterifying a part of the carboxyl groups with a monohydric alcohol containing not substantially more than 4 carbon atoms and then further esterifying the remaining carboxyl groups with a monohydric alcoholic ester of a polyhydroxy alcohol and an unsaturated higher fatty acid.

3. A method of treating resins resulting from the polymerization by addendum reaction of styrene and a material selected from a group consisting of α β unsaturated ethylene, α β dicarboxylic acids and the anhydrides thereof, said resins containing reactive carboxyl groups, which method comprises esterifying a part of the carboxyl groups with a monohydric alcohol containing not substantially more than 4 carbon atoms and then further esterifying the remaining carboxyl groups with a monohydric alcoholic ester of a polyhydroxy alcohol and an unsaturated free fatty acid from a drying oil.

4. A method of treating resins resulting from the polymerization by addendum reaction of styrene and a material selected from a group consisting of α β unsaturated ethylene, α β dicarboxylic acids and the anhydrides thereof, said resins containing reactive carboxyl groups, which method comprises esterifying a part of the carboxyl groups with a monohydric alcohol containing not substantially more than 4 carbon atoms and then further esterifying the remaining carboxyl groups with a monohydric alcoholic ester of a polyhydroxy alcohol and an unsaturated free fatty acid from linseed oil.

HOWARD L. GERHART.
WILLIAM W. BAUER.